United States Patent
Oigawa

(10) Patent No.: US 10,466,048 B2
(45) Date of Patent: Nov. 5, 2019

(54) DISTANCE MEASURING APPARATUS, DISTANCE MEASURING METHOD, AND IMAGE PICKUP APPARATUS

(71) Applicant: CANON KABUSHIKI KAISHA, Tokyo (JP)

(72) Inventor: Makoto Oigawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/989,446

(22) Filed: May 25, 2018

(65) Prior Publication Data

US 2018/0347979 A1    Dec. 6, 2018

(30) Foreign Application Priority Data

May 30, 2017 (JP) ................. 2017-106854

(51) Int. Cl.
| | |
|---|---|
| G01C 11/06 | (2006.01) |
| G01C 11/30 | (2006.01) |
| G06T 7/586 | (2017.01) |
| H04N 5/33 | (2006.01) |
| G01C 11/08 | (2006.01) |
| G06T 7/593 | (2017.01) |
| G01S 17/89 | (2006.01) |
| H04N 5/3745 | (2011.01) |
| H04N 5/369 | (2011.01) |

(52) U.S. Cl.
CPC .............. *G01C 11/30* (2013.01); *G01C 11/06* (2013.01); *G01C 11/08* (2013.01); *G01S 17/89* (2013.01); *G06T 7/586* (2017.01); *G06T 7/593* (2017.01); *H04N 5/33* (2013.01); *H04N 5/36961* (2018.08); *H04N 5/37457* (2013.01); *G06T 2207/10012* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 2009/0238449 A1* | 9/2009 | Zhang ................ | G01B 11/2536 382/165 |
| 2014/0132501 A1* | 5/2014 | Choi .................. | G01B 11/2545 345/156 |

(Continued)

FOREIGN PATENT DOCUMENTS

JP        H10318732 A      12/1998

*Primary Examiner* — Christopher G Findley
(74) *Attorney, Agent, or Firm* — Carter, DeLuca & Farrell LLP

(57) ABSTRACT

A distance measuring apparatus includes: an acquisition unit that acquires a first image at a first viewpoint where an object is irradiated with a first light including a pattern, a second image at a second viewpoint different from the first viewpoint where the object is irradiated with the first light, a third image at the first viewpoint where the object is irradiated with a second light not including a pattern, and a fourth image at the second viewpoint where the object is irradiated with the second light; and a control unit that acquires information corresponding to a distance, by employing a fifth image obtained based on a ratio the first image and the third image and a sixth image obtained based on a ratio of the second image and the fourth image.

17 Claims, 12 Drawing Sheets

(56) References Cited

U.S. PATENT DOCUMENTS

2016/0350929 A1* 12/2016 Tubic .................. G01B 11/25
2017/0111600 A1* 4/2017 Wang ............... G02B 23/2415
2017/0195654 A1* 7/2017 Powers ................ G06T 7/521

* cited by examiner

DISTANCE MEASURING APPARATUS, DISTANCE MEASURING METHOD, AND IMAGE PICKUP APPARATUS

BACKGROUND OF THE INVENTION

Field of the Invention

The present invention relates to a distance measuring apparatus, a distance measuring method, and an image pickup apparatus.

Description of the Related Art

Recently, technology for acquiring distance information from an image obtained by photographing, has been proposed. For example, acquiring a plurality of images at different viewpoints, determining a parallax amount based on correlation between the acquired plurality of images, and calculating a distance based on the obtained parallax amount, has been proposed. Japanese Patent Application Laid-Open No. H10-318732 discloses extracting a feature pattern by taking a difference between an image photographed by a left-and-right image photographing unit in a state where the feature pattern has been projected onto a measurement object and an image photographed in a state where the feature pattern is not projected onto the measurement object.

However, in the conventional technology, there have been cases where the distance cannot necessarily be satisfactorily measured.

An object of the present invention is to provide a distance measuring apparatus, a distance measuring method, and an image pickup apparatus that enable a distance to be satisfactorily measured.

SUMMARY OF THE INVENTION

According to one aspect of the embodiments, there is provided a distance measuring apparatus including: one or more processors; and a memory storing instructions which, when executed by the processors, cause the information processing apparatus to function as: an acquisition unit that acquires a first image at a first viewpoint where an object is irradiated with a first light including a pattern, a second image at a second viewpoint different from the first viewpoint where the object is irradiated with the first light, a third image at the first viewpoint where the object is irradiated with a second light not including a pattern, and a fourth image at the second viewpoint where the object is irradiated with the second light; and a control unit that acquires information corresponding to a distance, by employing a fifth image obtained based on a ratio the first image and the third image and a sixth image obtained based on a ratio of the second image and the fourth image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

As previously mentioned, in the conventional technology, there have been cases where the distance cannot necessarily be satisfactorily measured. For example, in the case of the object lacking a texture of a pattern or the like, the distance could not necessarily be satisfactorily measured. Moreover, in the case also of a reflectance of the object being extremely high, the distance could not necessarily be satisfactorily measured. Accordingly, the inventors of the invention of the present application thought of an invention of the kind below that should enable the distance to be satisfactorily measured.

The embodiments of the present invention will be described in detail below using the drawings. Note that the present invention is not limited to the embodiments below

First Embodiment

Figure 1:
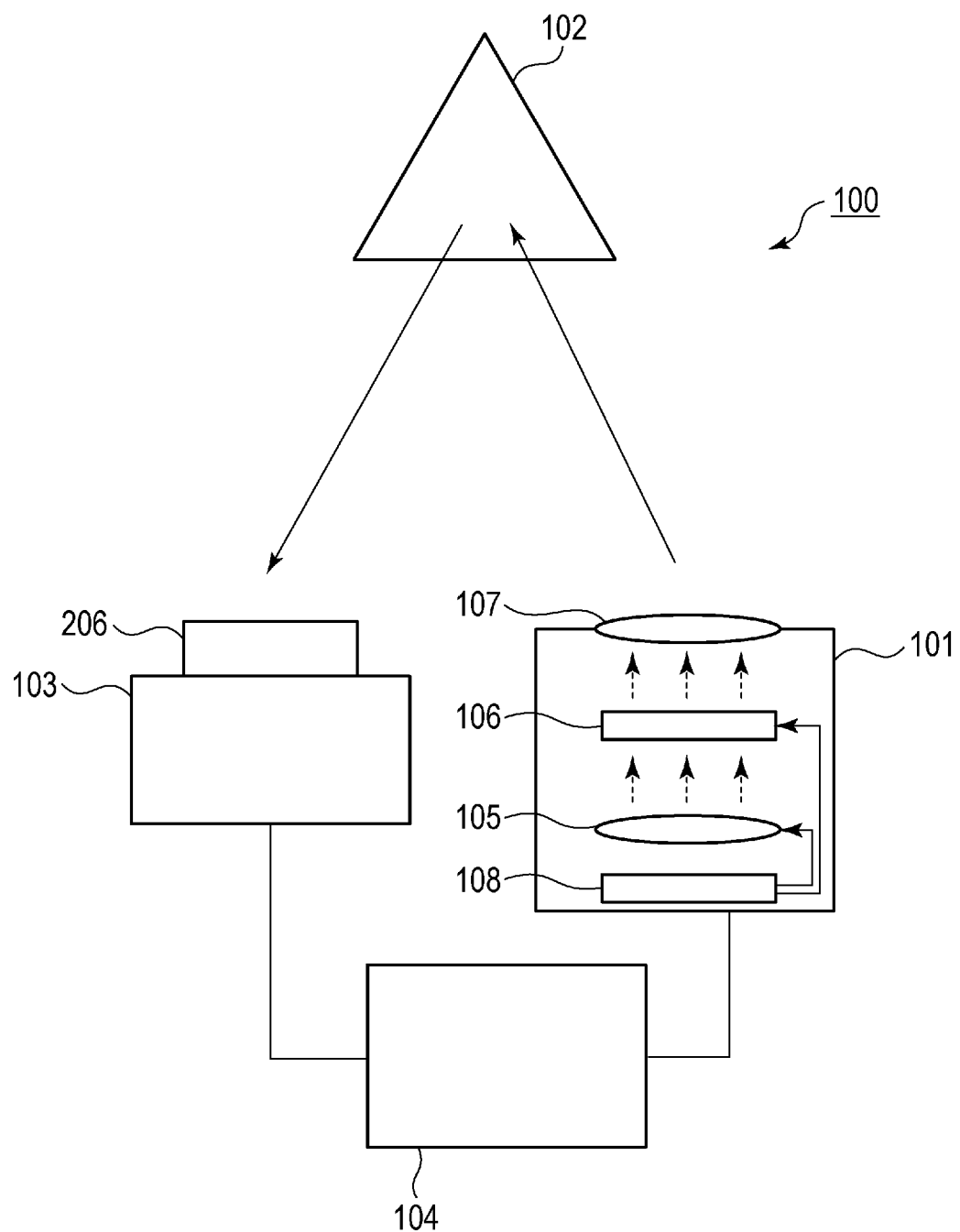
FIG. 1 is a schematic view showing a distance measuring apparatus according to a first embodiment.

A distance measuring apparatus and a distance measuring method according to a first embodiment will be described using the drawings. FIG. 1 is a schematic view showing the distance measuring apparatus according to the present embodiment. As shown in FIG. 1, a distance measuring apparatus 100 according to the present embodiment includes: an irradiating unit 101 that irradiates with a light; an image pickup unit 103 that can acquire a plurality of images at different viewpoints, that is, parallax images; and a control unit 104 that manages overall control of the distance measuring apparatus 100 according to the present embodiment.

The irradiating unit (photographing unit) 101 is provided with: a light source (Light source unit) 105 that emits a light; and a spatial light modulator 106 that generates a light including a pattern, that is, a patterned light, by modulating the light emitted from the light source 105. In addition, the irradiating unit 101 is provided with: a projection lens 107 that projects said patterned light, magnified, onto an object 102; and an irradiating unit-oriented control unit 108 that performs control of each of functional blocks included in the irradiating unit 101. From a viewpoint of performing a later-mentioned correction processing with high precision without being affected by a spectral reflectance of the object 102, the light source 105 is preferably a light source emitting a white light including an entire region of a visible light region, that is, a white light source. A discharge light emitting type light source such as a xenon lamp, for example, may be employed as the light source 105. The likes of a liquid crystal panel, for example, may be employed as the spatial light modulator 106. Although the case of the spatial light modulator 106 being a transmission type spatial light modulator is described here as an example, the spatial light modulator 106 is not limited to this. The liquid crystal panel is provided with a liquid crystal cell tilled with liquid crystal, and the liquid crystal cell has a large number of pixel electrodes arranged in a matrix therein. In the liquid crystal panel, by appropriate voltages being applied to the pixel electrodes arranged in a matrix, orientation directions of liquid crystal molecules are appropriately changed, and light transmitting places and light blocking places are formed so that a desired pattern is configured. As a result, the light from the light source 105 is modulated by the spatial light modulator 106 and light of the desired pattern is obtained. For example, in order to obtain light of a desired pattern 601 of the kind that will be mentioned later using FIG. 6, modulation is performed by the spatial light modulator 106. When modulation is performed by the spatial light modulator 106, light including the pattern, that is, patterned light is obtained. On the other hand, when modulation is not performed by the spatial light modulator 106, uniform light that does not include a pattern, that is, non-patterned light is obtained. Therefore, the irradiating unit 101 can also irradiate the object 102 with uniform light not including a pattern. That is, the irradiating unit 101 can selectively irradiate the object 102 with a first light including a pattern and a second light not including a pattern. Since the spatial light modulator 106 can be operated at high speed, the present embodiment makes it possible to irradiate sequentially at short time intervals with light including a pattern and light not including a pattern. Moreover, in the present embodiment, since presence/absence of the pattern is controlled using the spatial light modulator 106, irradiation with light including a pattern and light not including a pattern can be performed from the same position. As a result, a later-mentioned first parallax image and a later-mentioned second parallax image can be acquired using light irradiating from the same position. Since the later-mentioned correction processing is performed using the first parallax image and the second parallax image acquired using light irradiating from the same position, the present embodiment makes it possible for a high precision correction processing to be performed.

Figure 2:
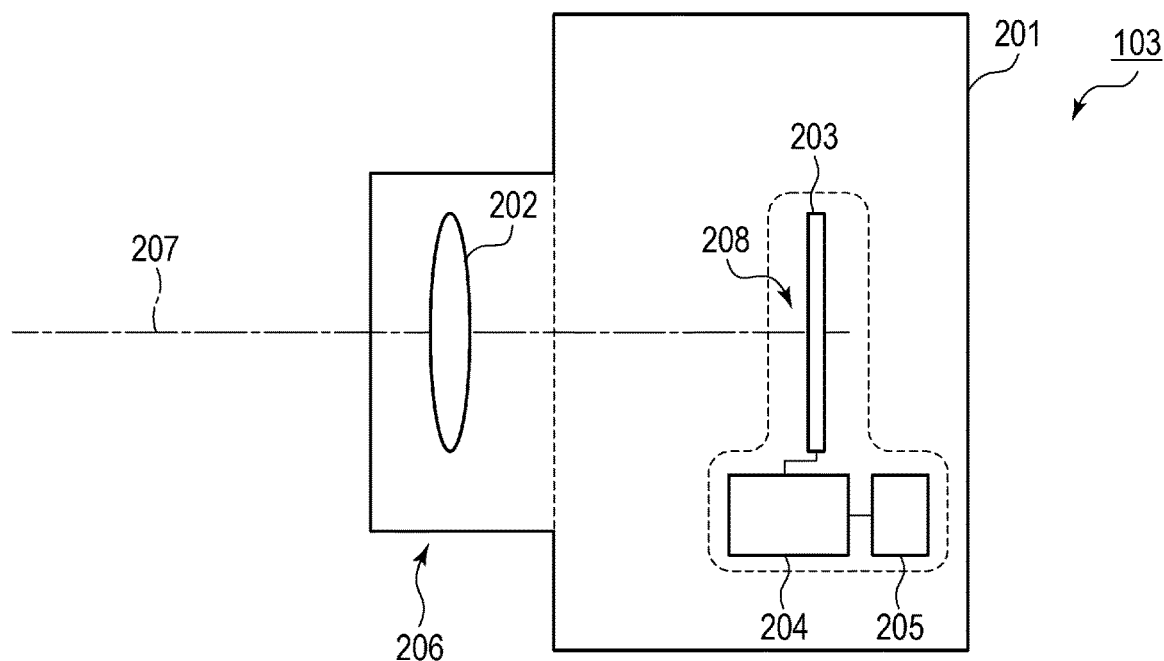
FIG. 2 is a schematic view showing an image pickup unit.

FIG. 2 is a schematic view showing an image pickup unit. The image pickup unit (image pickup apparatus) 103 is a digital camera, for example. A main body (body) 201 of the image pickup unit 103 is provided with an image pickup optical system (lens unit) 206 including an image pickup lens 202. The image pickup optical system 206 may be detachable or non-detachable with respect to the body 201. An image pickup element 203, a processing unit 204, a memory 205, and so on, are provided in the body 201. The dot-chain line in FIG. 2 shows an optical axis 207. An optical image (object image) formed by the image pickup optical system 206 is incident on an image pickup surface 208 of the image pickup element 203. The image pickup element 203 performs photoelectric conversion of the optical image formed by the image pickup optical system 206 and thereby generates an image (image data) of the object 102. The image data acquired by the image pickup element 203 is inputted to the processing unit 204. As mentioned above, the image pickup element 203 can acquire a plurality of images at different viewpoints. The processing unit (control unit) 204, in a state where the object 102 has been irradiated with the patterned light, employs the image pickup element 203 to acquire a first image at a first viewpoint and a second image at a second viewpoint different from the first viewpoint, and stores the acquired first image and second image in the memory 205. That is, the processing unit 204 can function as an acquisition unit that acquires the first image at the first viewpoint where the object has been irradiated with the first light including the pattern and the second image at the second viewpoint where the object has been irradiated with the first light. In addition, the processing unit 204, in a state where the object 102 has been irradiated with the uniform light not including the pattern, employs the image pickup element 203 to acquire a third image at the first viewpoint and a fourth image at the second viewpoint, and stores the acquired third image and fourth image in the memory 205. That is, the processing unit 204 can function as an acquisition unit that acquires the third image at the first viewpoint where the object has been irradiated with the second light not including the pattern and the fourth image at the second viewpoint where the object has been irradiated with the second light. The processing unit 204 acquires information relating to a distance, based on a correlation of a fifth image obtained based on a ratio of the first image and the third image and a sixth image obtained based on a ratio of the second image and the fourth image. Such information relating to a distance may be a parallax amount or may be a distance value to the object 102, for example. Moreover, the processing unit 204 stores the information relating to a distance in the memory 205.

Figure 3:
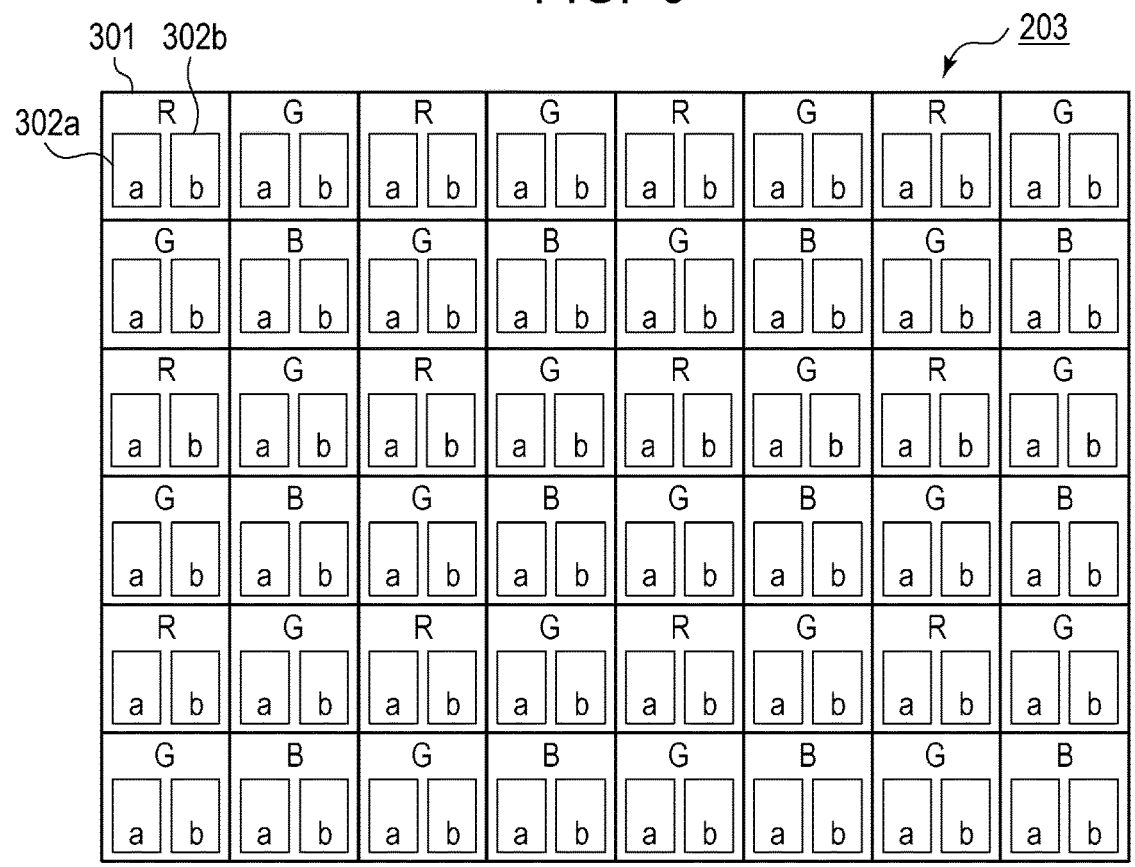
FIG. 3 is a plan view showing an example of arrangement of pixels.

FIG. 3 is a plan view showing an example of arrangement of pixels. Although the image pickup surface 208 of the image pickup element 203 has a large number of pixels, that is, a large number of unit pixels 301 arranged therein, here, 48 unit pixels 301 of the large number of unit pixels 301 are shown selected. As shown in FIG. 3, a plurality of the unit pixels 301 are arranged two-dimensionally, that is, in a matrix, in the image pickup surface 208 of the image pickup element 203. Color filters of R (Red), G (Green), and B (Blue) are arranged in a Bayer array, for example, on each of the unit pixels 301. A division pixel (subpixel) a and a division pixel (subpixel) b are respectively disposed in each of the unit pixels 301. The division pixels a, b are respectively provided with photodiodes (photoelectric conversion units) 302$a$, 302$b$. Each of output signals from the division pixels a, b have a parallax with each other as will be mentioned later. Note that a value of the output signal of the division pixel b may be calculated by subtracting a value of the output signal of the division pixel a from a summated value of the Output signals of the division pixels a, b. Note that although the case where one unit pixel 301 is configured by two division pixels a, b, that is, the case where one unit pixel 301 is divided into two has been described here as an example, the present invention is not limited to this. One unit pixel 301 may be configured by three or more division pixels, for example. Moreover, although the case where all of the unit pixels 301 provided in the image pickup surface 208 are respectively divided has been described here as an example, the present invention is not limited to this, and it is possible for only some of the unit pixels 301 to be divided.

Figure 4:
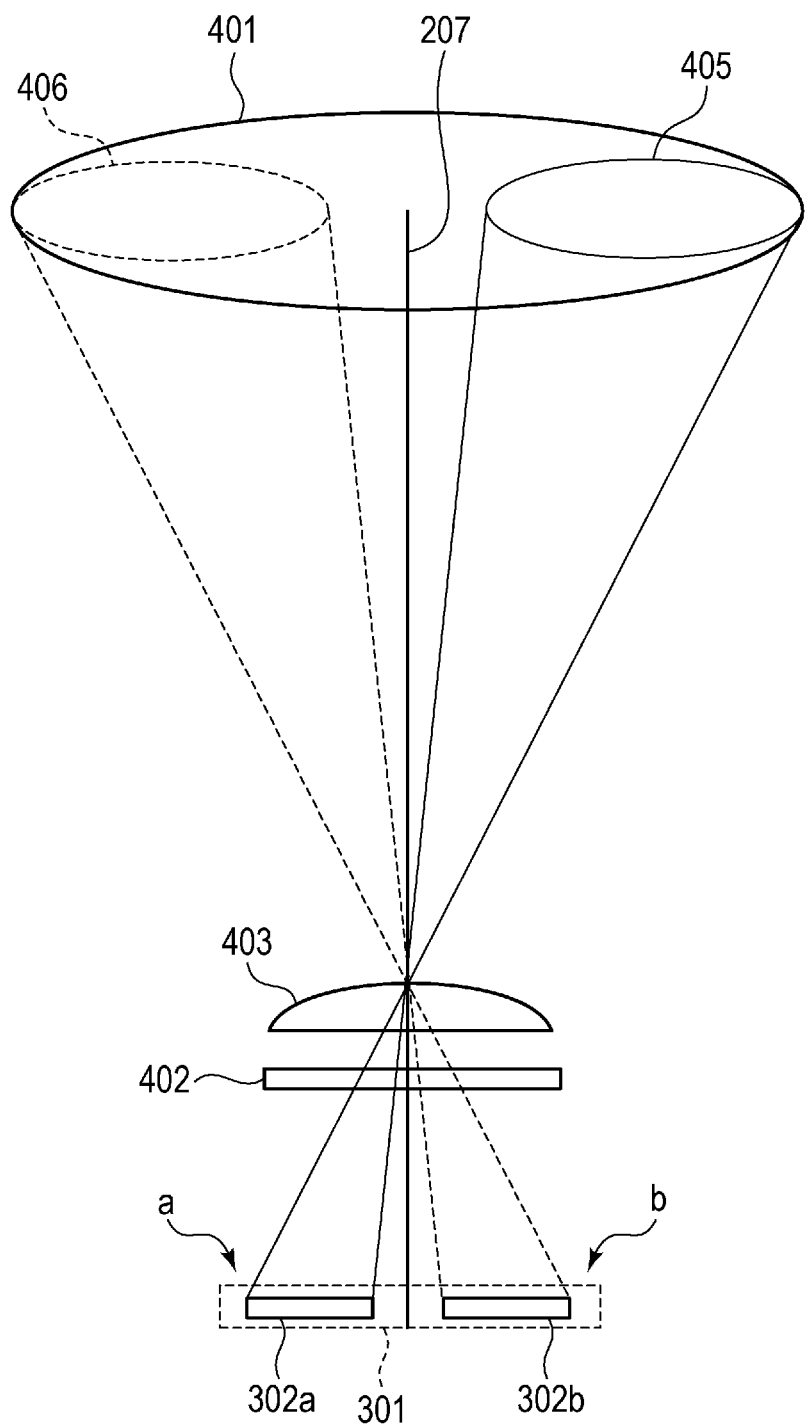
FIG. 4 is a schematic view showing a relationship between a luminous flux passing through an exit pupil of an image pickup optical system and the pixel.

FIG. 4 is a schematic view showing an example of a relationship between a luminous flux passing through an exit pupil of the image pickup optical system and the unit pixel. Note that FIG. 4 shows a relationship between a unit pixel positioned in a center of an angle of view and the luminous flux. As shown in FIG. 4, a color filter 402 and a micro-lens 403 are formed above the unit pixel 301. A center of a luminous flux passing through an exit pupil 401 of the image pickup optical system 206 (refer to FIG. 2) and the optical axis 207 coincide. The luminous flux that has passed through the exit pupil 401 is incident on the unit pixel 301 centered on the optical axis 207. A first pupil region 405 and a second pupil region 406 different from the first pupil region 405 are located in the exit pupil 401 of the image pickup optical system 206. The luminous flux passing through the first pupil region 405 is received by the photodiode 302a provided in the division pixel a, via the micro-lens 403. On the other hand, the luminous flux passing through the second pupil region 406 is received by the photodiode 302b provided in the division pixel b, via the micro-lens 403. Thus, the division pixels a, b respectively receive light from the separate pupil regions 405, 406 of the exit pupil 401 of the image pickup optical system 206. Therefore, a parallax exists between a signal acquired by the division pixel a and a signal acquired by the division pixel b.

Figure 5:
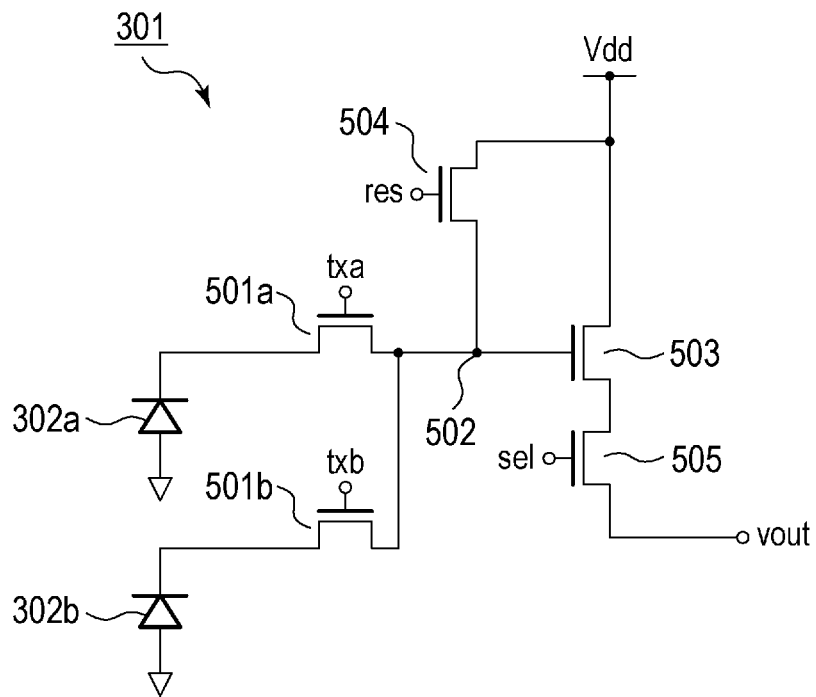
FIG. 5 is a circuit diagram of the pixel.

FIG. 5 is a circuit diagram of the pixel. The photodiodes 302a, 302b respectively provided in the division pixels a, b perform photoelectric conversion of light, that is, optical images respectively incident on the division pixels a, b and accumulate charges corresponding to exposure amounts. By setting signals txa, txb applied to gates of transfer switches 501a, 501b to High level, the respective charges accumulated in the photodiodes 302a, 302b are transferred to a floating diffusion portion 502. The floating diffusion portion 502 is connected to a gate of an amplifier transistor 503, and a potential of the gate of the amplifier transistor 503 attains a potential corresponding to charge amounts transferred from the photodiodes 302a, 302b. A drain of the amplifier transistor 503 is connected to a power supply potential Vdd. An output of the amplifier transistor 503 is connected to a current source (not illustrated) via a vertical output line (not illustrated). The amplifier transistor 305 and the current source configure a source follower circuit. A drain of a resetting switch (resetting transistor) 504 for resetting the floating diffusion portion 502 is connected to the power supply potential Vdd. By setting a signal res applied to a gate of the resetting switch 504 to High level, the floating diffusion portion 502 is reset. When resetting the charges of the photodiodes 302a, 302b, the signal res and the signals txa, txb are simultaneously set to High level, whereby the transfer switches (transfer gates) 501a, 501b and the resetting switch 504 are both turned on. Then, resetting of the photodiodes 302a, 302b is performed via, the floating diffusion portion 502. By setting a signal sel applied to a gate of a selecting switch (selecting transistor) 505 to High level, a pixel signal corresponding to the potential of the gate of the amplifier transistor 503 is outputted to an output vout of the unit pixel 301. Note that the circuit of the pixel is not limited to the circuit shown in FIG. 5.

An aggregate of output signals of the division pixels a, that is, first division pixels of each of the unit pixels 301 arranged two-dimensionally in the image pickup element 203 configures an A image as one image of parallax images. Moreover, an aggregate of output signals of the division pixels b, that is, second division pixels of each of the unit pixels 301 arranged two-dimensionally in the image pickup element 203 configures a B image as the other image of the parallax images. Note that the B image may be acquired by subtracting the A image from an A+B image. The A image and the B image acquired by the image pickup element 203 are transmitted to the processing unit 204. The processing unit 204 performs the later-mentioned kind of correction processing on the A image and the B image, and calculates a distance value indicating a distance to the object 102, based on a correlation of the A image and the B image obtained by implementing the correction processing. The processing unit 204 stores the calculated distance value in the memory 205. Distance measuring calculation may be performed by a publicly known method. For example, the distance value may be acquired by calculating a correlation value by SSD (Sum of Squared Difference), determining a parallax amount from the calculated correlation value, and converting the determined parallax amount into a distance.

In the case of the object 102 lacking a pattern or the like, that is, in the case of the object 102 lacking a texture, it is difficult for a prominent peak to be seen in the correlation value of the A image and the B image, and the distance value cannot be determined with high precision. Accordingly, in the present embodiment, patterned light is projected onto the object 102 by the irradiating unit 101 to impart a texture to a surface of the object 102, whereby a prominent peak is configured to appear in the correlation value of the A image and the B image.

Figure 6:
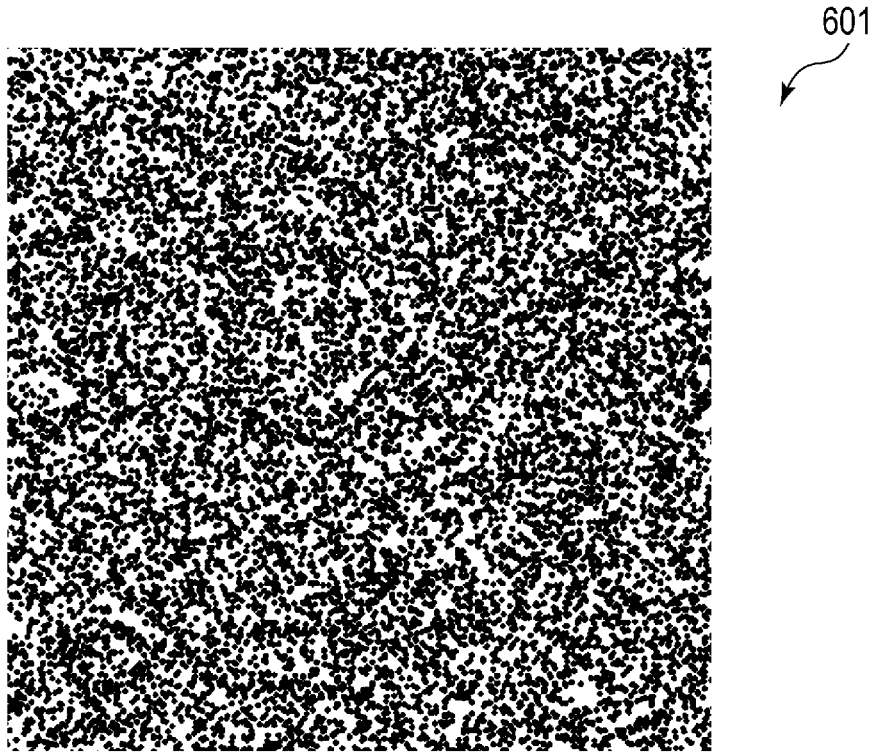
FIG. 6 is a view showing an example of a pattern projected onto irradiated onto an object.

FIG. 6 is a view showing an example of a pattern projected onto the object. As shown in FIG. 6, in the pattern 601, dots are arranged so that their periodicities or sizes are random in all directions. If such a pattern 601 in which dots have been arranged randomly in all directions is projected onto the object 102, a limitation never occurs in a shape of a later-mentioned window 705, and a limitation never occurs in a division direction of the unit pixel 301 either. It is therefore preferable to employ the pattern 601 of random dots like that shown in FIG. 6. The pattern like that shown in FIG. 6 may be generated using the spatial light modulator 106 provided in the irradiating unit 101. Note that the pattern projected onto the object 102 is not limited to the pattern of the kind shown in FIG. 6, and may be appropriately set.

It is possible for mutually corresponding regions to be respectively set with respect to the A image and the B image, and for a parallax amount between the A image and the B image to be calculated based on the peak of the correlation value of an A image signal and a B image signal acquired while gradually shifting relative positions of these regions. However, when both a portion where reflectance is comparatively low and a portion where reflectance is comparatively high are located in such a region, a signal corresponding to the portion where reflectance is comparatively high becomes dominant, and the parallax amount between the A image and the B image cannot necessarily be accurately calculated. In such a case, the parallax amount between the A image and the B image cannot necessarily be accurately calculated, hence the distance value to the object 102 cannot necessarily be accurately calculated, even when employing an image obtained by photographing the object 102 onto which the pattern 601 has been projected. Accordingly, in the present embodiment, an image obtained by photographing the object 102 onto which the pattern 601 has not been projected is also employed, and the later-mentioned kind of correction processing is performed, thereby achieving an improvement in distance measuring precision.

Figure 7A:
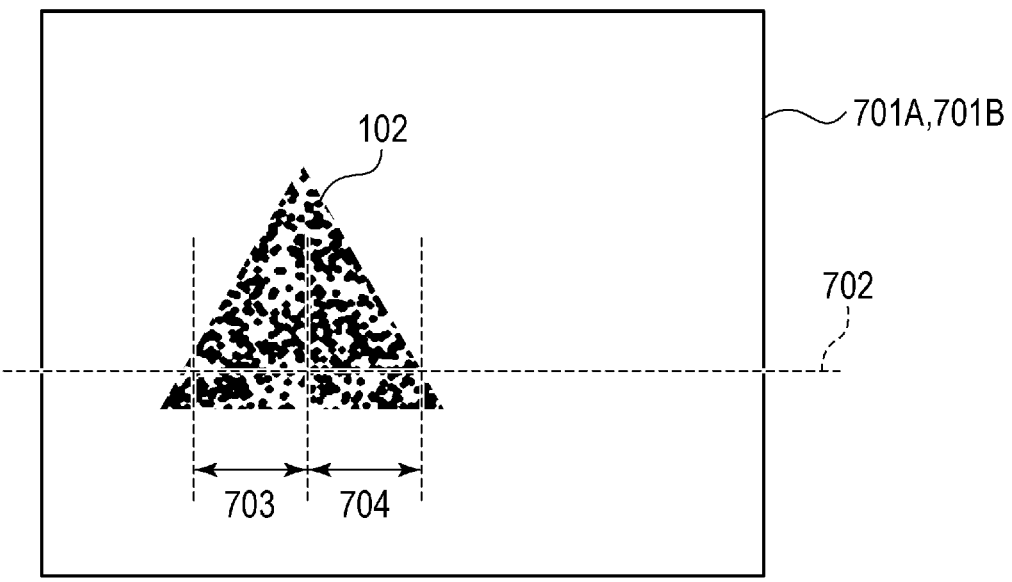
FIGS. 7A and 7B are views showing examples of an image obtained by photographing the object onto which light including a pattern has been projected, and a signal intensity distribution.

By photographing the object 102 in a state of the pattern 601 having been projected thereon, that is, in a state of the object 102 having been irradiated with patterned light, a first A image 701A, that is, the first image, and a first B image 701B, that is, the second image are obtained. FIG. 7A is a view showing an example of the image obtained by photographing the object 102 onto which the pattern 601 has been projected. As shown in FIG. 7A, a texture is imparted to the surface of the object 102 by projection of the pattern 601. Although a parallax occurs mutually between the first A image 701A and the first B image 701B, here, for convenience of explanation, the first A image 701A and the first B image 701B are shown conceptually using the same drawing.

Figure 7B:
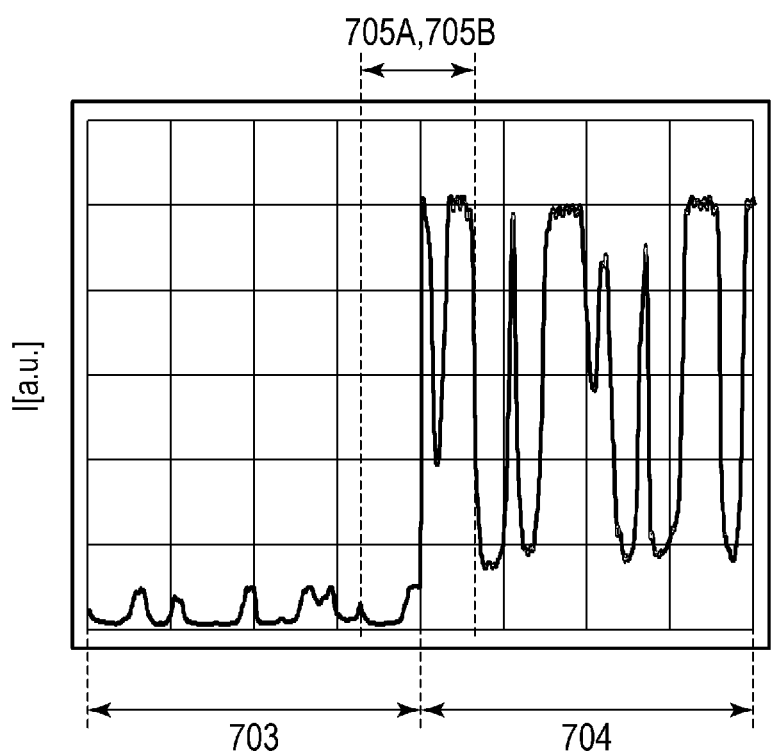

FIG. 7B shows an example of a signal intensity distribution along a line segment 702 shown in FIG. 7A. The horizontal axis shows a position, and the vertical axis shows a signal intensity 1. As may be understood from FIG. 7B, a portion 703 where reflectance is comparatively low and a portion 704 where reflectance is comparatively high exist in the object 102. Regions representing comparison targets when determining the correlation value of the A image and the B image are demarcated by windows 705A, 705B like those indicated in FIG. 7B. It is assumed that the symbol 705 will be used when describing the windows in general, the symbol 705A will be used when describing the specific window relating to the A image, and the symbol 705B will be used when describing the specific window relating to the B image.

Figure 8A:
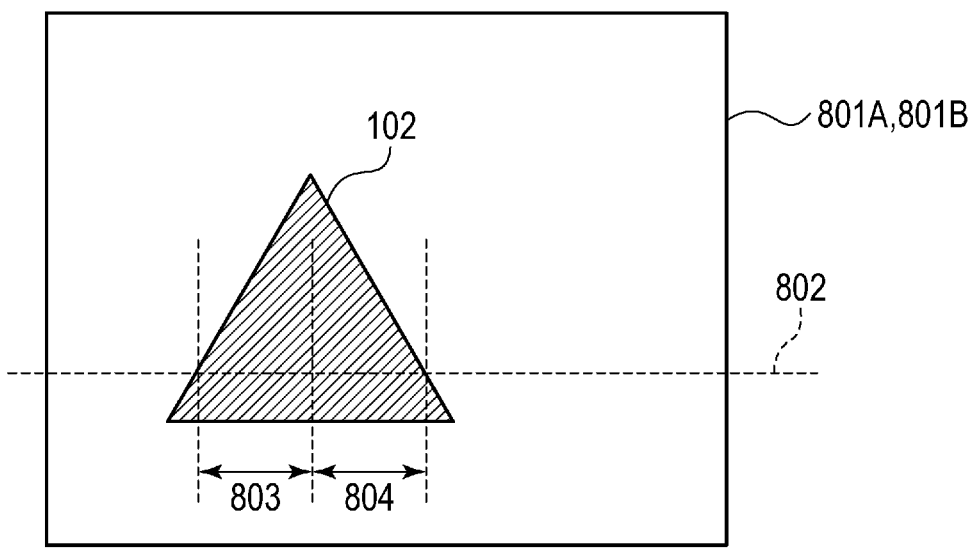
FIGS. 8A and 8B are views showing examples of an image obtained by photographing the object onto which light not including a pattern has been irradiated, and a signal intensity distribution.

By photographing the object 102 in a state where it has been irradiated with uniform light not including a pattern, a second A image 801A, that is, the third image, and a second B image 801B, that is, the fourth image are obtained. FIG. 8A is a view showing an example of the image obtained by photographing the object 102 in a state where it has been irradiated with uniform light not including a pattern. As shown in FIG. 8A, the pattern 601 is not projected onto the surface of the object 102. Although a parallax occurs mutually between the second A image 801A and the second B image 801B, here, for convenience of explanation, the second A image 801A and the second B image 801B are shown using the same drawing.

Figure 8B:
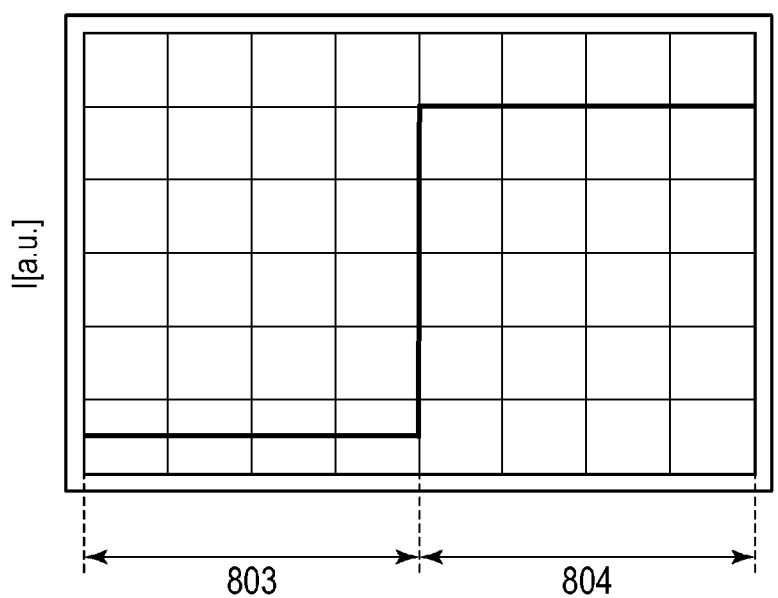

FIG. 8B shows an example of a signal intensity distribution along a line segment 802 shown in FIG. 8A. The horizontal axis shows a position, and the vertical axis shows a signal intensity 1. As may be understood from FIG. 8B, a portion 803 where reflectance is comparatively low and a portion 804 where reflectance is comparatively high exist in the object 102.

Figure 9A:
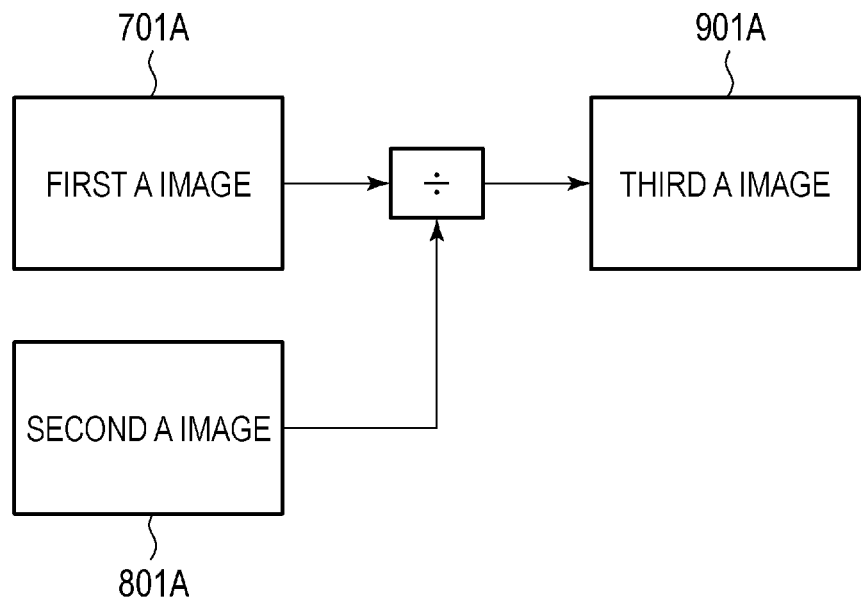
FIGS. 9A and 9B are views showing conceptually a correction processing performed by the distance measuring apparatus according to the first embodiment.
Figure 9B:
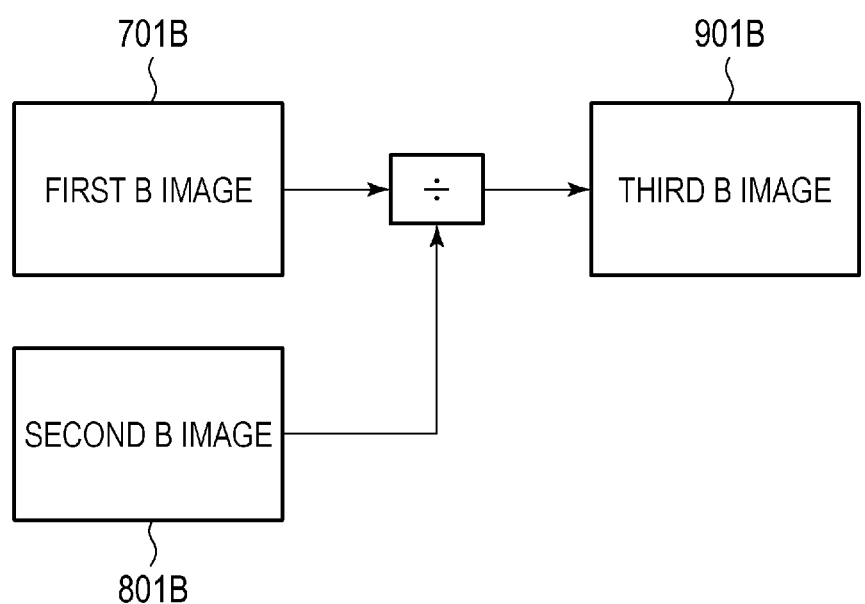
Figure 10:
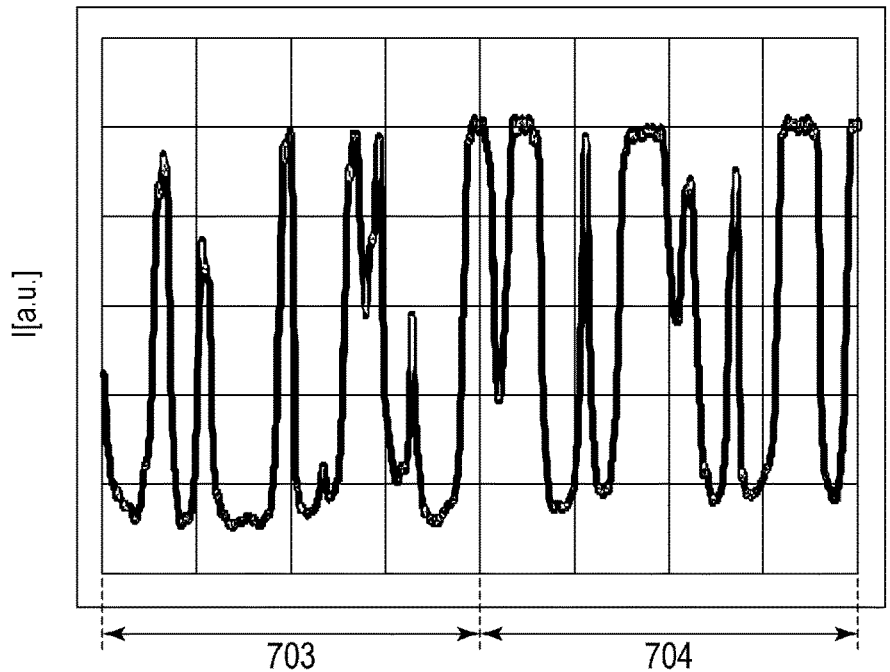
FIG. 10 is a view showing an example of a signal intensity distribution obtained by implementing the correction processing.

As mentioned above, when both a portion where reflectance is comparatively low and a portion where reflectance is comparatively high are located in the windows 705A, 705B, a signal corresponding to the portion where reflectance is comparatively high becomes dominant, and the parallax amount between the A image and the B image cannot necessarily be accurately calculated. If the parallax amount cannot be accurately calculated, then the distance value cannot be accurately calculated. Accordingly, in the present embodiment, the following kind of correction processing is performed. That is, as shown in FIG. 9A, the first A image 701A obtained by photographing in a state where irradiation has been performed with light including a pattern is divided by the second A image 801A obtained by photo-graphing in a state where irradiation has been performed with light not including a pattern. At this time, each of pixel values of the first A image 701A is divided by the pixel value of the second A image 801A corresponding to each of the pixels of the first A image 701A. By performing such a correction processing, a third A image 901A from which effects of reflectance have been eliminated, that is, the fifth image is obtained. In addition, as shown in FIG. 9B, the first B image 701B obtained by photographing in a state where irradiation has been performed with light including a pattern is divided by the second B image 801B obtained by photographing in a state where irradiation has been performed with light not including a pattern. At this time, each of pixel values of the first B image 701B is divided by the pixel value of the second B image 801B corresponding to each of the pixels of the first B image 701B. By performing such a correction processing, a third B image 901B from which effects of reflectance have been eliminated, that is, the sixth image is obtained. FIG. 10 is a view showing an example of a signal intensity distribution obtained by implementing the correction processing. FIG. 10 shows an example of a signal intensity distribution of the third A image 901A and the third B image 901B along a line segment corresponding to the line segments 702, 802. Although a parallax exists in the third A image 901A and the third B image 901B, for convenience of explanation, the signal intensity distribution in the third A image 901A and the signal intensity distribution in the third B image 901B are shown here using the same drawing. Then, a parallax amount is calculated based on a correlation value of the thus obtained third A image 901A and third B image 901B. Both the third A image 901A and the third B image 901B have effects of reflectance eliminated therefrom, hence if the parallax amount is calculated based on their correlation value, a high precision parallax amount is obtained. Therefore, the present embodiment makes it possible for the distance value to be determined with high precision, even when places whose reflectances differ from each other exist in the object 102.

Figure 11:
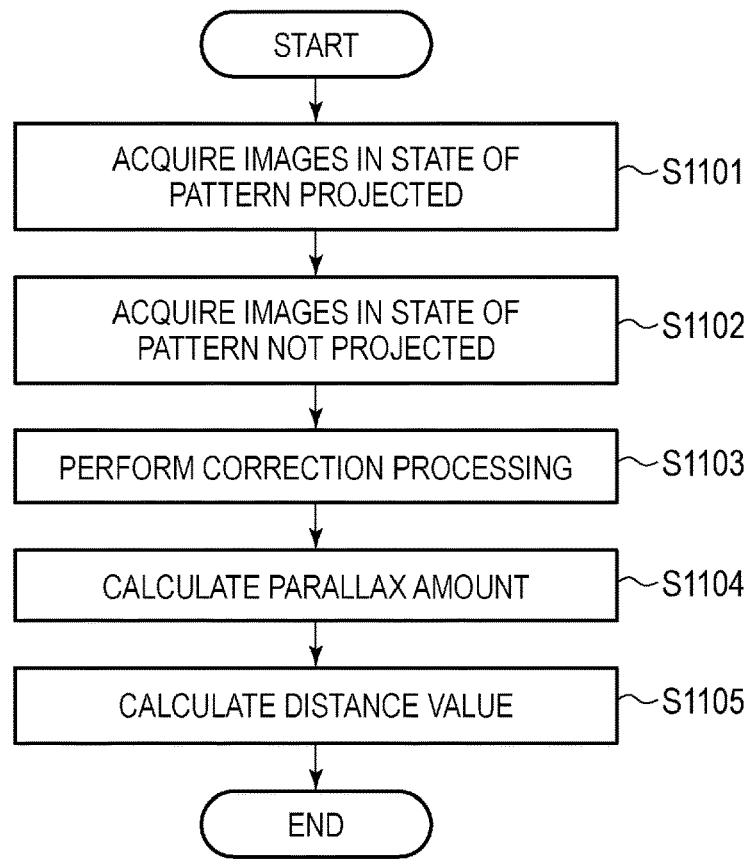
FIG. 11 is a flowchart showing operation of the distance measuring apparatus according to the first embodiment.

FIG. 11 is a flowchart showing operation of the distance measuring apparatus according to the present embodiment.

In step S1101, the control unit 104 controls the irradiating unit 101 and the image pickup unit 103 so that an image of the object 102 is acquired in a state where the object 102 has been irradiated with light including a pattern. As a result, first parallax images, that is, the first A image 701A and the first B image 701B that have been obtained by photographing in a state where the object 102 has been irradiated with the light including a pattern, are obtained. The processing unit (control unit) 204 provided in the image pickup unit 103 stores the first A image 701A and the first B image 701B in the memory 205 provided in the image pickup unit 103. After this, operation shifts to step S1102.

In step S1102, the control unit 104 controls the irradiating unit 101 and the image pickup unit 103 so that an image of the object 102 is acquired in a state where the object 102 has been irradiated with uniform light not including a pattern. As a result, second parallax images, that is, the second A image 801A and the second B image 801B that have been obtained by photographing in a state where the object 102 has been irradiated with the light not including a pattern, are obtained. The processing unit 204 stores the second A image 801A and the second B image 801B in the memory 205. After this, operation shifts to step S1103.

In step S1103, the processing unit 204 provided in the image pickup unit 103 performs the correction processing for eliminating effects of reflectance, as follows. The processing unit 204 divides the first A image 701A obtained by photographing in a state where irradiation has been performed with the light including a pattern by the second A image 801A obtained by photographing in a state where irradiation has been performed with the light not including a pattern. As a result, the processing unit 204 acquires the third A image 901A. In addition, the processing unit 204 divides the first B image 701B obtained by photographing in a state where irradiation has been performed with the light including a pattern by the second B image 801B obtained by photographing in a state where irradiation has been performed with the light not including a pattern. As a result, the processing unit 204 acquires the third B image 901B. The processing unit 204 stores the thus obtained third A image 901A and third B image 901B in the memory 205. After this, operation shifts to step S1104.

In step S1104, the processing unit 204 calculates a correlation value of the third A image 901 A and the third B image 901B, and calculates a parallax amount by, for example, subpixel estimation as a known method. After this, operation shifts to step S1105.

In step S1105, the processing unit 204 provided in the image pickup unit 103 converts the parallax amount to a distance value by, for example, a known method. For example, the parallax amount is converted to the distance value based on a base length and a geometrical relationship. For example, a spacing on the exit pupil 401 between a centroid of a luminous flux passing through the first pupil region 405 and a centroid of a luminous flux passing through the second pupil region 406 corresponds to the base length. Thus, the distance value, that is, a distance to the object 102 is determined.

Thus, due to the present embodiment, the first A image 701A obtained by photographing in a state where irradiation has been performed with light including a pattern is divided by the second A image 801A obtained by photographing in a state where irradiation has been performed with light not including a pattern. As a result, the third A image 901A from which effects of reflectance have been eliminated is obtained. Moreover, in the present embodiment, the first B image 701B obtained by photographing in a state where irradiation has been performed with light including a pattern is divided by the second B image 801B obtained by photographing in a state where irradiation has been performed with light not including a pattern. As a result, the third B image 901B from which effects of reflectance have been eliminated is obtained. Then, the parallax amount is calculated based on the correlation value of the thus obtained third A image 901A and third B image 901B. Because the correlation value is calculated using the third A image 901A and the third B image 901B from which effects of reflectance have been eliminated and the parallax amount is calculated based on said correlation value, a high precision parallax amount is obtained, even when places having different reflectances exist in the object 102. Because the distance to the object is determined based on the thus obtained parallax amount, the distance to the object can be determined with high precision. Thus, because the present embodiment makes it possible for effects of reflectance of the object 102 to be eliminated, the present embodiment makes it possible to provide a distance measuring apparatus and a distance measuring method that enable a distance to be satisfactorily determined.

Second Embodiment

Figure 12:
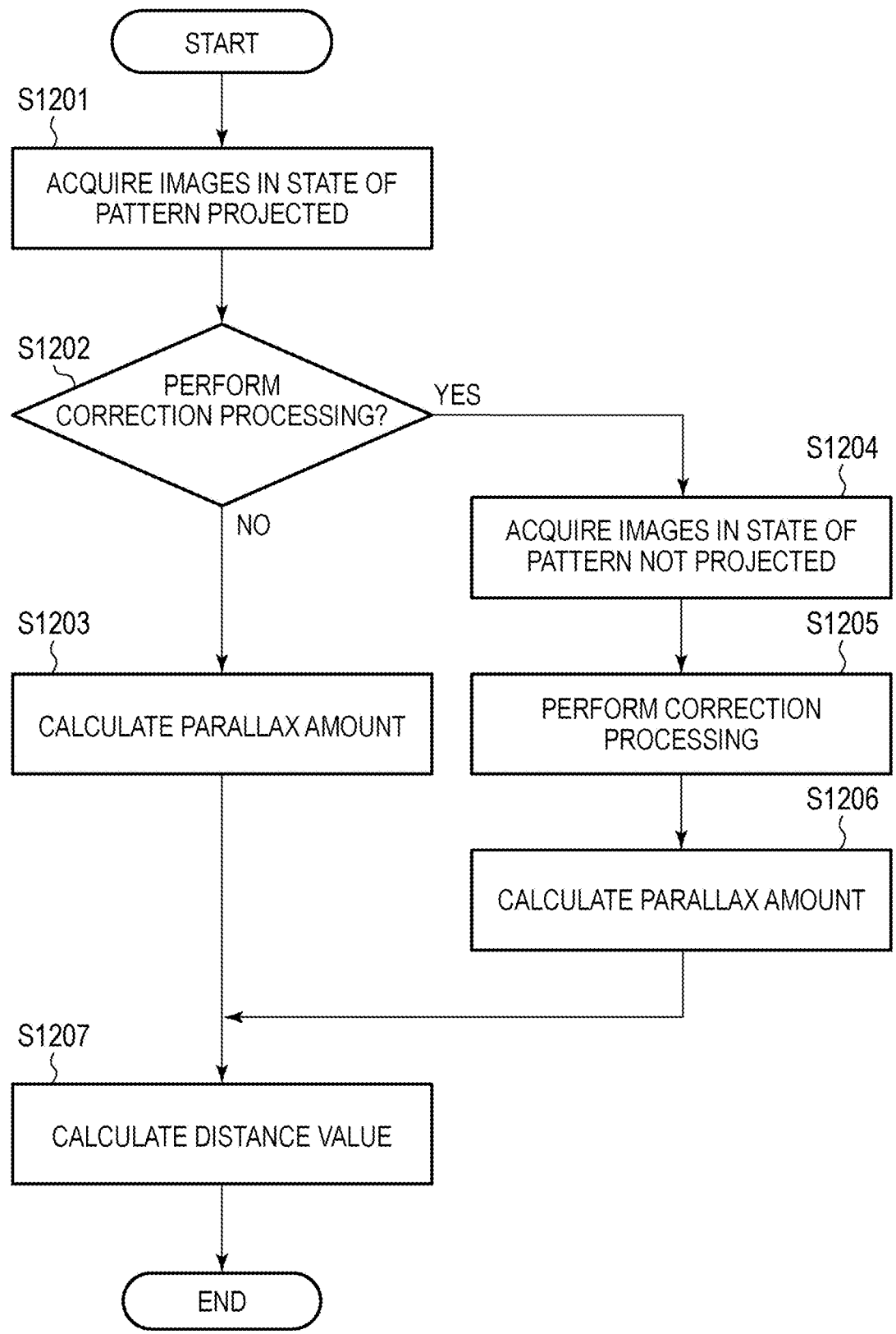
FIG. 12 is a flowchart showing operation of a distance measuring apparatus according to a second embodiment.

A distance measuring apparatus and a distance measuring method according to a second embodiment will be described using the drawings. FIG. 12 is a flowchart showing operation of the distance measuring apparatus according to the present embodiment. The distance measuring apparatus according to the present embodiment makes a judgement of whether to perform the correction processing for eliminating effects of reflectance, or not. The processing unit 204 judges whether to perform acquisition of the third image (second A image 801A) and fourth image (second B image 801B) employed in the correction processing, or not, based on the first image (first A image 701A) or the second image (first B image 701B).

In step S1201, the control unit 104, similarly to in above-mentioned step S1101 in the first embodiment, controls the irradiating unit 101 and the image pickup unit 103 so that an image of the object 102 is acquired in a state where the object 102 has been irradiated with light including a pattern. As a result, the first parallax images, that is, the first A image 701A and the first B image 701B that have been obtained by photographing in a state where irradiation has been performed with the light including a pattern, are obtained. The processing unit 204 provided in the image pickup unit 103 stores the first A image 701A and the first B image 701B in the memory 205 provided in the image pickup unit 103. After this, operation shifts to step S1202.

In step S1202, the processing unit 204 provided in the image pickup unit 103 judges whether to perform the correction processing for eliminating effects of reflectance, on the first parallax images obtained in step S1201, or not, as follows. That is, the processing unit 204 sets a window of a certain size in the image acquired in step S1201 and, based on a difference between a maximum value and a minimum value of luminance of a portion located in said window, calculates a contrast value of said portion. The processing unit 204, while sequentially changing a position of the window, sequentially calculates the contrast value within the window at each position, and generates a histogram of the calculated plurality of contrast values, that is, a contrast histogram. When the contrast value corresponding to a peak present in the contrast histogram is less than a preset threshold value, the correction processing for eliminating effects of reflectance needs to be performed. That is, when reflectance of the object 102 is low, the correction processing for eliminating effects of reflectance needs to be performed. In addition, when a plurality of peaks are present in the contrast histogram and the contrast value corresponding to any of the plurality of peaks is less than a preset threshold value, the correction processing for eliminating effects of reflectance needs to be performed. That is, when an object 102 having a place where reflectance is high and a place where reflectance is low is photographed, the correction processing for eliminating effects of reflectance needs to be performed. When correction of reflectance needs to be performed (YES in step S1202), operation shifts to S1204. In cases other than the above-described cases, there is no need for the correction processing for eliminating effects of reflectance to be performed. When the correction processing for eliminating effects of reflectance is not performed (NO in step S1202), operation shifts to step S1203.

In step S1203, the processing unit 204 provided in the image pickup unit 103 calculates a correlation value of the first A image 701A and the first B image 701B, and calculates a parallax amount by, for example, subpixel estimation as a known method. After this, operation shifts to step S1207.

In step S1204, the control unit 104, similarly to in above-mentioned step S1102 in the first embodiment, controls the irradiating unit 101 and the image pickup unit 103 so that an image of the object 102 is acquired in a state where the object 102 has been irradiated with uniform light not including a pattern. As a result, second parallax images, that is, the second A image 801A and the second B image 801B that have been obtained by photographing in a state where the object 102 has been irradiated with the light not including a pattern, are obtained. The processing unit 204 stores the second A image 801A and the second B image 801B in the memory 205. After this, operation shifts to step S1205.

In step S1205, the processing unit 204 provided in the image pickup unit 103, similarly to in above-mentioned step S1103 in the first embodiment, performs the correction processing for eliminating effects of reflectance, as follows. The processing unit 204 divides the first A image 701A obtained by photographing in a state where irradiation has been performed with the light including a pattern by the second A image 801A obtained by photographing in a state where irradiation has been performed with the light not including a pattern. As a result the processing unit 204 acquires the third A image 901A. In addition, the processing unit 204 divides the first B image 701B obtained by photographing in a state where irradiation has been performed with the light including a pattern by the second B image 801B obtained by photographing in a state where irradiation has been performed with the light not including a pattern. As a result, the processing unit 204 acquires the third B image 901B. The processing unit 204 stores the thus obtained third A image 901A and third B image 901B in the memory 205. After this, operation shifts to step S1206.

In step S1206, the processing unit 204, similarly to in above-mentioned step S1104 in the first embodiment, calculates a correlation value of the third A image 901A and the third B image 901B, and calculates a parallax amount by, for example, subpixel estimation as a known method. After this, operation shifts to step S1207.

In step S1207, the processing unit 204 provided in the image pickup unit 103, similarly to in above-mentioned step S1105 in the first embodiment, converts the parallax amount to a distance value by a known method. Thus, the distance value, that is, a distance to the object 102 is determined.

Thus, due to the present embodiment, a judgement of whether to perform the correction processing for eliminating effects of reflectance, or not, is performed, and when there is no need for such correction processing, photographing in a state where the object 102 has been irradiated with the light not including a pattern is not performed, and such correction processing is not performed either. As a result, the present embodiment makes it possible for a speeding up of measurement of distance to be achieved.

Modified Embodiments

While the present invention has been described in detail above based on preferred embodiments thereof, the present invention is not limited to these specific embodiments, and a variety of forms in a range not departing from the spirit of the present invention are also included in the present invention.

For example, although the above-described embodiments described as an example the case where the irradiating unit 101 is provided with a spatial light modulator 106 of transmission type employing a liquid crystal panel, the present invention is not limited to this. For example, a spatial light modulator 106 of reflection type provided with the likes of LCOS (Liquid Crystal On Silicon) may be provided in the irradiating unit 101. Moreover, the spatial light modulator 106 may be configured using a DMD (Digital Micromirror Device).

Moreover, although the above-described embodiments described as an example the case where a discharge light emitting type light source such as a xenon lamp is employed as the light source 105, the present invention is not limited to this. For example, it is also possible for the likes of a semiconductor light emitting element such as an LED, a laser, or an organic EL (Organic Electro-Luminescence) to be employed as the light source 105.

Figure 13:
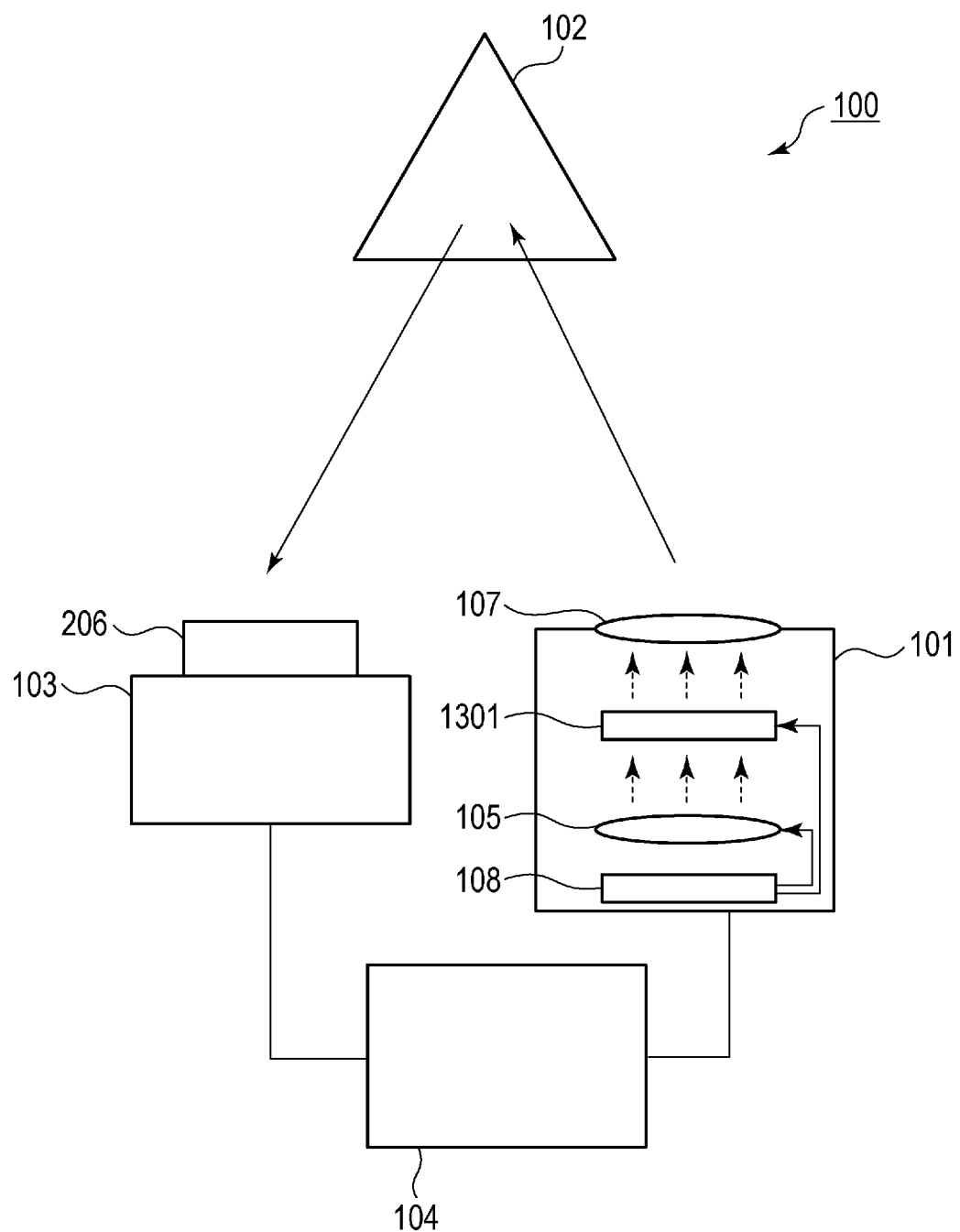
FIG. 13 is a schematic view showing an example of a distance measuring apparatus according to a modified embodiment.

Moreover, although the above-described embodiments described as an example the case where control of the pattern is performed using the spatial light modulator 106, the present invention is not limited to this. For example, light provided with the pattern may be generated by positioning on an optical path a mask on which the pattern has been formed. For example, the likes of a mask configured from a glass plate on which the pattern has been formed or a mask configured from a metal plate on which the pattern has been formed, may be cited as such a mask. FIG. 13 is a schematic view showing an example of a distance measuring apparatus according to a modified embodiment. As shown in FIG. 13, the irradiating unit 101 is provided with a mask 1301. Light emitted from the light source 105 passes through the mask 1301, whereby light provided with the pattern is obtained. The pattern 601 of the kind shown in FIG. 6, for example, is formed in the mask 1301. The mask 1301 may be driven by an unillustrated actuator. Adopting a state such that the mask 1301 is not positioned on the optical path makes it possible to obtain uniform light not including the pattern. On the other hand, adopting a state such that the mask 1301 is positioned on the optical path makes it possible to obtain light including the pattern. It is thus possible to configure so that control of presence/absence of the pattern is performed using the mask 1301.

Moreover, although the above-described embodiments described as an example the case where the pattern is controlled using the spatial light modulator 106, it is possible to configure so that the pattern is controlled by switching the light source. For example, when a laser diode (LD: Laser Diode) is employed as the light source, it is possible for speckles to be generated. Therefore, by employing the laser diode as the light source, it is possible to obtain light including a pattern due to the speckles. On the other hand, when a light emitting diode (LED: Light Emitting Diode) is employed as the light source, speckles are not generated, hence it is possible to obtain uniform light. Thus, by switching the light source, it is possible also to control presence/absence of the pattern. When presence/absence of the pattern is controlled by such a method, the spatial light modulator 106 or the like becomes unnecessary, and a contribution can be made to downsizing and cost reduction.

Moreover, although the above-described embodiments described as an example the case where the light source 105 is a white light source, the present invention is not limited to this. For example, the light source 105 may be configured by a red (R) light source, a green (G) light source, and a blue (B) light source. Bandwidths of light respectively emitted from these three colors of light sources coincide with a transmission bandwidth of the color filter 402 (refer to FIG. 4) provided in the image pickup element 203 (refer to FIG. 2). Therefore, if the light source 105 is configured by light sources of the three colors of R, G, and B, a contribution can be made to improving utilization efficiency of light.

Moreover, although the above-described embodiments described as an example the case where the light source 105 is a light source emitting visible light, the present invention is not limited to this. For example, the light source 105 may be a light source emitting infrared (IR: Infrared) light, that is, an infrared light source. Moreover, it is possible to configure so that the image pickup element 203 includes: a color filter having a transmission bandwidth corresponding to the infrared light; and pixels having a light receiving sensitivity to the infrared light. This makes it possible to obtain image data for appreciation of RGB and image data for distance measurement employing the infrared light. When a wavelength bandwidth of the infrared light spans from 800 nm to 1100 nm, it is possible for photoelectric conversion to be performed by a photoelectric conversion unit formed in a silicon substrate. It is therefore possible to acquire the image data for appreciation and the image data for distance measurement simply by carrying out the likes of a change in arrangement of the color filter.

Moreover, although in the above-described embodiments, luminous fluxes respectively passing through a mutually differing plurality of pupil regions were respectively received by a plurality of division pixels, whereby the parallax images were acquired, the present invention is not limited to this. For example, it is possible to configure so that optical images formed by respective ones of a plurality of image pickup optical systems undergo image pickup by separate image pickup elements, whereby the parallax images are acquired. That is, it is possible to configure so that the parallax images are obtained by a stereo camera. In this case, the base length can be made large, hence an improvement in distance measuring precision can be achieved.

Moreover, although the above-described embodiments described as an example the case where the irradiating unit 101 and the image pickup unit 103 are provided separately, the present invention is not limited to this. For example, the irradiating unit 101 and the image pickup unit 103 may have a configuration enabling them to be integrated. Since integration of the irradiating unit 101 and the image pickup unit 103 leads to a state where a positional relationship of the irradiating unit 101 and the image pickup unit 103 is fixed, it is preferable from a viewpoint of measurement precision if the irradiating unit 101 and the image pickup unit 103 can be integrated. For example, the irradiating unit 101 may be configured by a strobe apparatus attached to the image pickup unit 103, and the strobe apparatus as the irradiating unit 101 may be provided with the spatial light modulator 106, and so on.

Moreover, although the above-described embodiments described as an example the case where the control unit 104 is provided separately from the image pickup unit 103, the present invention is not limited to this. For example, the processing unit 204 provided in the image pickup unit 103 may double as the control unit 104. This makes it possible for the likes of downsizing or cost reduction to be achieved. In this case, the distance measuring apparatus 100 according to the present embodiment may be considered included in the image pickup unit 103. That is, the distance measuring apparatus 100 according to the present embodiment may be considered included in an image pickup apparatus.

Other Embodiments

Figure 14A:
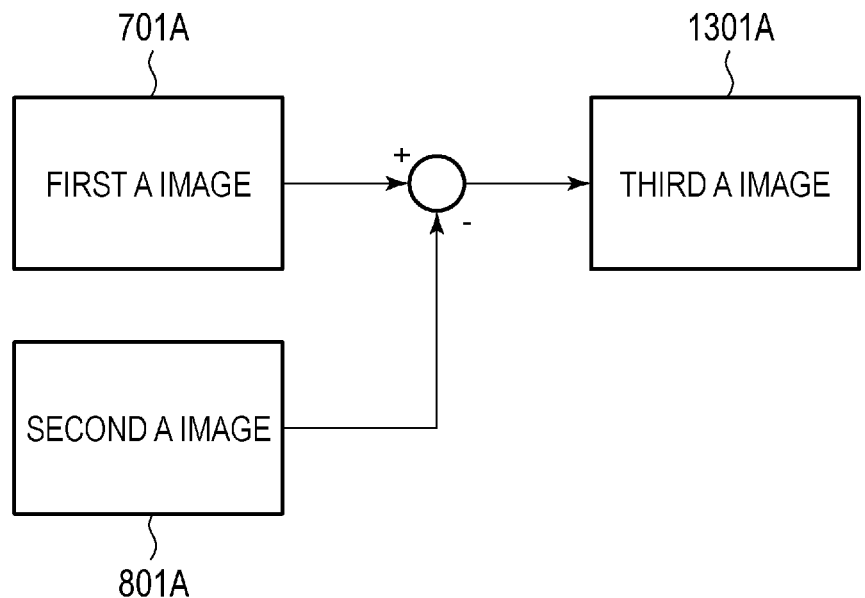
FIGS. 14A and 14B are views showing conceptually a correction processing performed by a distance measuring apparatus according to a modified embodiment.
Figure 14B:
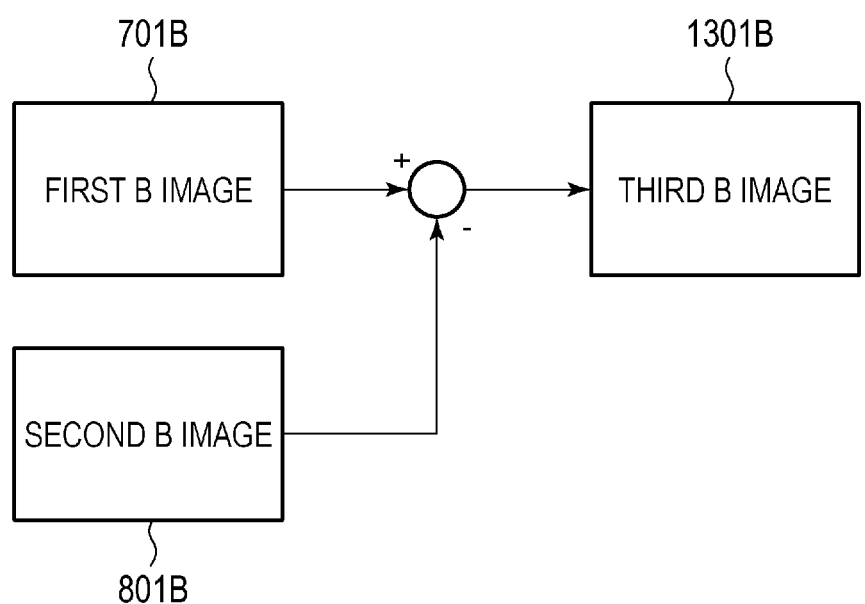

Moreover, the above-described embodiments described as an example the case where the third A image 901A is generated by dividing the first A image 701A by the second A image 801A and the third B image 901B is generated by dividing the first B image 701B by the second B image 801B. However, the present invention is not limited to this. FIGS. 14A and 14B are views showing conceptually the correction processing performed by a distance measuring apparatus according to a modified embodiment. For example, as shown in FIG. 14A, a third A image 1301A may be generated by subtracting the second A image 801A from the first A image 701A. Moreover, as shown in FIG. 14B, a third B image 1301B may be generated by subtracting the second B image 801B from the first B image 701B. Thus, the fifth image (third A image 1301A) may be generated by subtracting the third image (second A image 801A) from the first image (first A image 701A). Moreover, the sixth image (third 13 image 1301B) may be generated by subtracting the fourth image (second B image 801B) from the second image (first B image 701B). That is, the third A image 1301A may be a difference between the first A image 701A and the second A image 801A, and the third B image 1301E may be a difference between the first B image 701B and the second B image 801B. In this case, configuring so that subtraction is performed instead of division makes it possible to lighten a load during computation.

Moreover, although the above-described embodiments described as an example the case where an entirety of the object 102 is irradiated with light including a pattern, an entirety of the object 102 is irradiated with uniform light not including a pattern, and the correction processing is performed on an entire image, the present invention is not limited to this. For example, it is possible to configure so that part of the object 102 is irradiated with the light including a pattern, part of the object 102 is irradiated with the uniform light not including a pattern, and the correction processing is performed on part of the image. Configuring so as to perform the correction processing on part of the image and not the entirety of the image makes it possible to reduce a load during the correction processing. In this case, for example, a preset attention-worthy object region may be set as said part. Moreover, said part may be determined based on a result of a face judgement or the like. Moreover, said part may be determined based on a result of the likes of a main object judgement based on luminance, contrast, or the like.

Figure 15A:
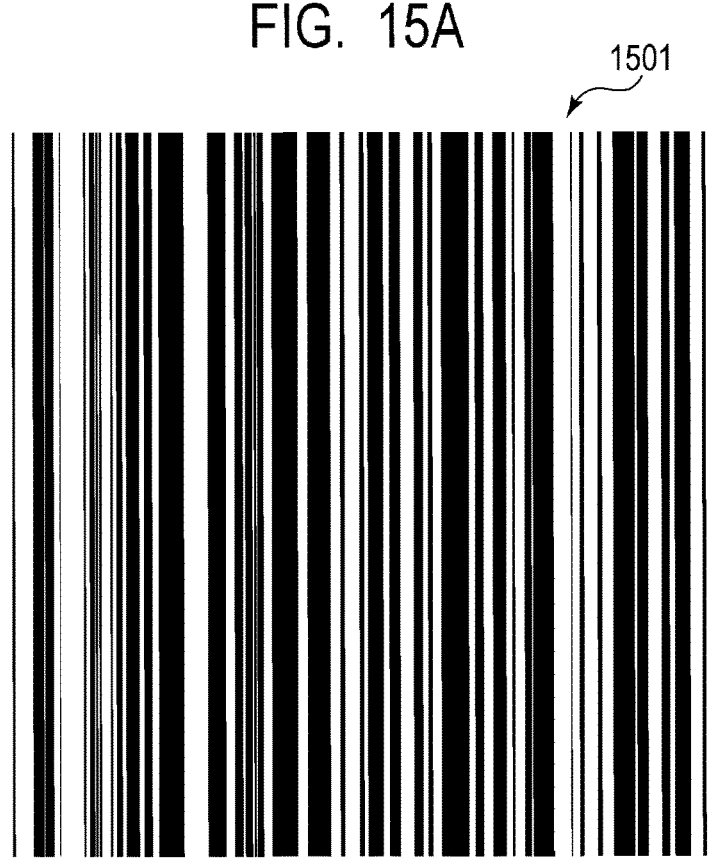
FIGS. 15A and 15B are views showing examples of patterns employed in a modified embodiment.
Figure 15B:
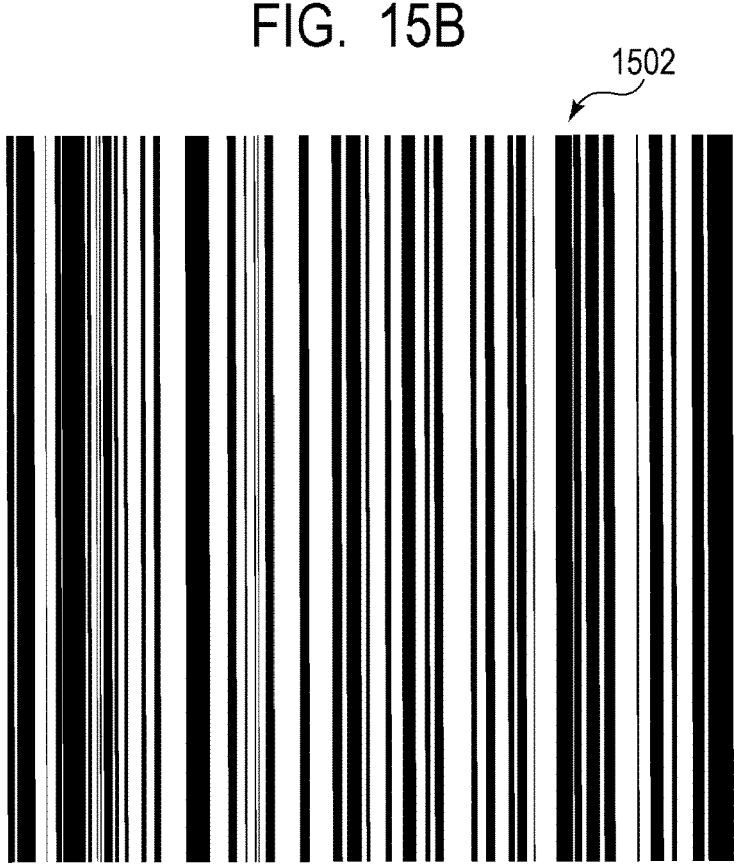

Moreover, although the above-described embodiments described as an example the case where the image pickup element 203 is used to acquire the third image at the first viewpoint and the fourth image at the second viewpoint in a state where the object 102 has been irradiated with the second light not including a pattern, the present invention is not limited to this. For example, it is possible to configure so that the image pickup element 203 is used to acquire a seventh image at the first viewpoint and an eighth image at the second viewpoint in a state where the object 102 has been irradiated with a third light including a reversed pattern that has light and dark reversed with respect to a pattern of the first light. Moreover, it is possible to configure so as to generate the third image where the object 102 has been irradiated with uniform light not including a pattern, by adding the first image and the seventh image. In addition, it is possible to configure so as to generate the fourth image where the object 102 has been irradiated with uniform light not including a pattern, by adding the second image and the eighth image. FIGS. 15A and 15B are views showing examples of patterns employed in a modified embodiment. FIG. 15A shows an example of a pattern 1501 that has not been reversed, and FIG. 15B shows an example of a reversed pattern 1502 in which light and dark of the pattern 1501 shown in FIG. 15A have been reversed. For example, the pattern 1501 like that shown in FIG. 15A can be employed as the first light. Moreover, the pattern 1502 like that shown in FIG. 15B can be employed as the third light. The processing unit 204 may function as a generating unit that generates the third image by adding the first image and the seventh image and generates the fourth image by adding the second image and the eighth image.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may he provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to he accorded the broadest interpretation so as to encompass all such modifications and equivalent structures and functions.

This application claims the benefit of Japanese Patent Application No. 2017-106854, filed May 30, 2017, which is hereby incorporated by reference herein in its entirety.

What is claimed is:

1. A distance measuring apparatus comprising:
   one or more processors; and
   a memory storing instructions which, when executed by the processors, cause the information processing apparatus to function as:
   an acquisition unit that acquires a first image at a first viewpoint where an object is irradiated with a first light comprising a pattern, a second image at a second viewpoint different from the first viewpoint where the object is irradiated with the first light, a third image at the first viewpoint where the object is irradiated with a second light not comprising a pattern, and a fourth image at the second viewpoint where the object is irradiated with the second light;
   and a control unit that acquires information corresponding to a distance, by employing a fifth image obtained based on a ratio of the first image and the third image and a sixth image obtained based on a ratio of the second image and the fourth image.

2. The distance measuring apparatus according to claim 1, wherein
   the third image is generated by adding to the first image a seventh image at the first viewpoint where the object is irradiated with a third light comprising a reversed pattern that has light and dark reversed with respect to the pattern, and
   the fourth image is generated by adding to the second image an eighth image at the second viewpoint where the object is irradiated with the third light.

3. The distance measuring apparatus according to claim 1, wherein
   the fifth image is generated by dividing the first image with the third image, and the sixth image is generated by dividing the second image with the fourth image.

4. The distance measuring apparatus according to claim 1, wherein
   the fifth image is generated by dividing the first image by the third image, and
   the sixth image is generated by dividing the second image by the fourth image.

5. The distance measuring apparatus according to claim 1, wherein
   the fifth image is generated by subtracting the third image from the first image, and
   the sixth image is generated by subtracting the fourth image from the second image.

6. The distance measuring apparatus according to claim 1, wherein
   the information relating to a distance is a parallax amount.

7. The distance measuring apparatus according to claim 1, wherein
   the information relating to a distance is a distance to the object.

8. The distance measuring apparatus according to claim 1, further comprising an irradiating unit, wherein
   the irradiating unit comprises a light source and a spatial light modulator that generates the first light by modulating light emitted from the light source, and
   the irradiating unit selectively irradiates the object with the first light and the second light.

9. The distance measuring apparatus according to claim 1, further comprising an irradiating unit, wherein
   the irradiating unit comprises a light source and a mask that generates the first light from light emitted from the light source, and
   the irradiating unit selectively irradiates the object with the first light and the second light.

10. The distance measuring apparatus according to claim 7, wherein
    the light source comprises a white light source.

11. The distance measuring apparatus according to claim 7, wherein
    the light source comprises a red light source, a green light source, and a blue light source.

12. The distance measuring apparatus according to claim 7, wherein
    the light source comprises an infrared light source.

13. The distance measuring apparatus according to claim 1, wherein
    the control unit controls so as to judge whether to perform acquisition of the third image and the fourth image, or not, based on the first image or the second image.

14. An image pickup apparatus comprising:
    one or more processors; and
    a memory storing instructions which, when executed by the processors, cause the information processing apparatus to function as:
    an image pickup unit that acquires a first image at a first viewpoint where an object is irradiated with a first light comprising a pattern, a second image at a second viewpoint different from the first viewpoint where the object is irradiated with the first light, a third image at the first viewpoint where the object is irradiated with a second light not comprising a pattern, and a fourth image at the second viewpoint where the object is irradiated with the second light; and a control unit that employs a fifth image obtained based on a ratio of the first image and the third image and a sixth image obtained based on a ratio of the second image and the fourth image, and thereby acquires information corresponding to a distance.

15. An image pickup apparatus comprising:

one or more processors; and a memory storing instructions which, when executed by the processors, cause the information processing apparatus to function as:

an image pickup unit that acquires a first image at a first viewpoint where an object is irradiated with a first light comprising a pattern, a second image at a second viewpoint different from the first viewpoint where the object is irradiated with the first light, a seventh image at the first viewpoint where the object is irradiated with a third light comprising a reversed pattern that has light and dark reversed with respect to the pattern, and an eighth image at the second viewpoint where the object is irradiated with the third light;

a generating unit that generates a third image by adding the first image and the seventh image and generates a fourth image by adding the second image and the eighth image; and a control unit that acquires information corresponding to a distance, by employing a fifth image obtained based on a ratio of the first image and the third image and a sixth image obtained based on a ratio of the second image and the fourth image.

16. A distance measuring method comprising:

one or more processors; and a memory storing instructions which, when executed by the processors, cause the information processing apparatus to function as:

acquiring a first image at a first viewpoint where an object is irradiated with a first light comprising a pattern, a second image at a second viewpoint different from the first viewpoint where the object is irradiated with the first light, a third image at the first viewpoint where the object is irradiated with a second light not comprising a pattern, and a fourth image at the second viewpoint where the object is irradiated with the second light; and acquiring information corresponding to a distance, by employing a fifth image obtained based on a ratio of the first image and the third image and a sixth image obtained based on a ratio of the second image and the fourth image.

17. A recording medium on which is recorded a program storing instructions for causing a computer to execute the steps of:

acquiring a first image at a first viewpoint where an object is irradiated with a first light comprising a pattern, a second image at a second viewpoint different from the first viewpoint where the object is irradiated with the first light, a third image at the first viewpoint where the object is irradiated with a second light not comprising a pattern, and a fourth image at the second viewpoint where the object is irradiated with the second light; and acquiring information corresponding to a distance, by employing a fifth image obtained based on a ratio the first image by the third image and a sixth image obtained based on a ratio of the second image and the fourth image.

* * * * *